United States Patent [19]
Pehrson

[11] 4,390,989
[45] Jun. 28, 1983

[54] METHOD AND AN ARRANGEMENT FOR SUPERVISING FAULTS WHEN TRANSMITTING DATA BETWEEN COMPUTERS

[75] Inventor: Jens E. Pehrson, Stocksund, Sweden

[73] Assignee: Telefonaktiebolaget L M Ericsson, Stockholm, Sweden

[21] Appl. No.: 229,595

[22] PCT Filed: May 14, 1980

[86] PCT No.: PCT/SE80/00140
§ 371 Date: Jan. 15, 1981
§ 102(e) Date: Jan. 7, 1981

[87] PCT Pub. No.: WO80/02611
PCT Pub. Date: Nov. 27, 1980

[30] Foreign Application Priority Data
May 15, 1979 [SE] Sweden .............................. 7904270

[51] Int. Cl.³ .............................................. G06F 11/10
[52] U.S. Cl. .................................... 371/22; 371/53
[58] Field of Search ................. 371/22, 32, 35, 49, 371/53, 54

[56] References Cited
U.S. PATENT DOCUMENTS 3,573,726  4/1971  Towell et al. .................. 371/54
3,753,225  8/1973  Liddell .......................... 371/54
3,967,250  6/1976  Senda et al. ................. 371/32 X
4,112,414  9/1978  Iscol et al. ................... 371/22
4,208,650  6/1980  Horn ........................... 371/49 X

*Primary Examiner*—Jerry Smith
*Attorney, Agent, or Firm*—Hane, Roberts, Spiecens & Cohen

[57] ABSTRACT

Arrangement in data transmission between a transmitting computer, sending signal words containing start-stop information, message words and address-control signal information, and a receiving computer, for providing separate supervision of faults on the transmission lines and of such errors which are caused by faults in the signal equipment pertaining to the computer of the transmitter side, intermediate stations or the computer on the receiver side. The arrangement includes means for generating and checking two check sums which are mutually supplementary, an inner check sum (S) for monitoring the hardware incorporated in computers and intermediate stations on a transmission path, and an outer check sum (YS) for monitoring the transmission lines. The inner check sum is formed by adding all the message words in a complete signal word; and the outer check sum is formed by adding the address-control signal information, message words and the inner check sum.

6 Claims, 2 Drawing Figures

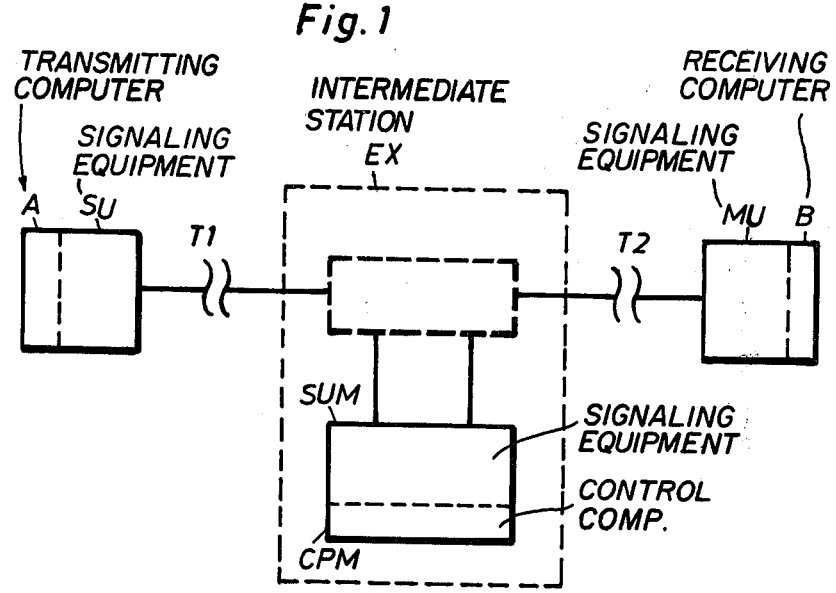

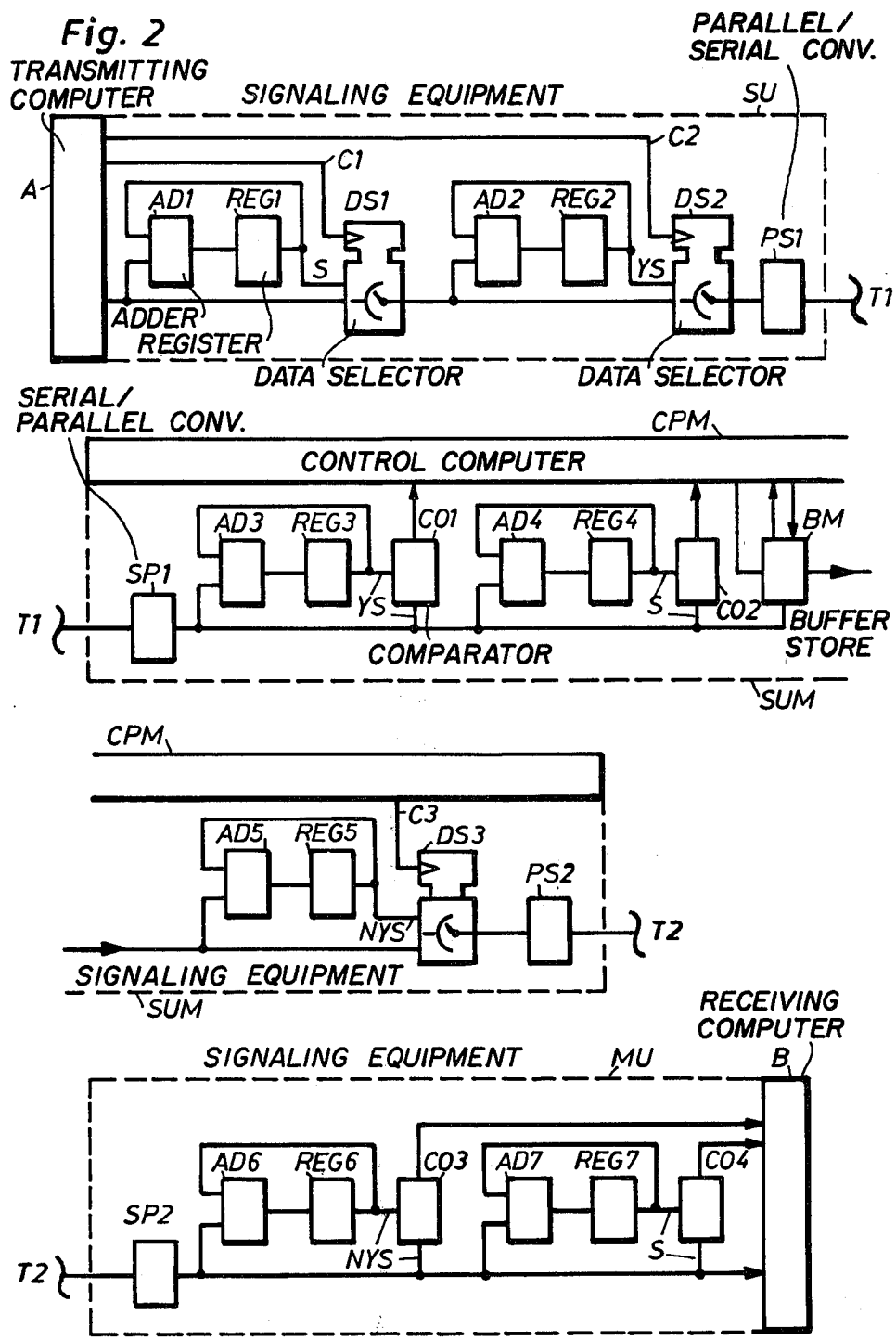

METHOD AND AN ARRANGEMENT FOR SUPERVISING FAULTS WHEN TRANSMITTING DATA BETWEEN COMPUTERS

FIELD OF THE INVENTION

The invention relates to a method and an arrangement when transmitting data between a transmitting computer, which sends signal words containing start-stop information, message words and address- and control signal information, and a receiving computer, to provide separate, supervision, of faults occurring on the transmission lines and of such errors which are caused by faults in the signalling equipment associated with the computer on the receiver side.

DISCUSSION OF THE PRIOR ART

There is a method described in the INTERNATIONAL STANDARD/ISO 3309-1976 (E) for monitoring transmission lines with the help of a so-called frame checking sequence (FCS) or outer check sum. The majority of known modern systems within this field of technology apply monitoring by means of check sums according to the standardized method, or some form of parity check. parity check and check sum can also be combined.

A disadvantage as well as a problem with the known and standardized method is that it only monitors the transmission line (including repeaters). Apart from start-stop bits, the format for a complete message also includes the message transmission portion or header, message words and check sums. The header contains addresses and control signals, e.g. acknowledgement signals. In each node or terminal in a transmission path between two computers, the contents of the header is altered. The information in the header will thus be somewhat different on the input from what it is on the output of a terminal. The outer check sum is calculated with regard to the contents in the header and the message words, from which it is apparent that the check sum is recalculated in each terminal before a new transmission. If a fault occurs in the terminal equipment, giving rise to an error in the data message, an incorrect check sum is obtained from the terminal output. The receiving station, however, accepts the message as correct since it makes the calculation on the same data as the transmitting station. The receiving station can thus accept an incorrect message since the method does not allow supervision of the terminal equipment itself.

SUMMARY OF THE INVENTION

The method and the arrangement in accordance with the invention, which solves the problem constitutes an arrangement for generating and checking two check sums which complement, each other: an inner check sum S for monitoring the hardware included in the computers and intermediate stations on a transmission path, and an outer check sum YS for monitoring the transmission lines. The inner check sum S is formed by adding all the data words in a message. The information in the message header is not included in the inner check sum S. In every terminal or node between a transmitting computer and a receiving computer a check is made of the correctness of the check sum S, and at each point where an error is detected, retransmission or change-over to a reserve link can be initiated. Since the check sum S is only checked and not recalculated in the terminals, i.e. since the same check sum accompanies the message the whole way between transmitting and receiving computer, detection of the errors caused by faults in the terminal equipment is also enabled. The outer check sum YS is formed by adding all the data words in a message, the information in the header and the inner check sum S.

By utilizing two check sums there is obtained a combined monitoring effect, enabling the circuits for generating and checking the outer check sum YS to be made just as simple as the circuits for generating and checking the inner check sum S, without deterioration of the error detection probability on the transmission lines.

The advantage with the arrangement in accordance with the invention in relation to the state of the art is thus that by combination of two check sums there is obtained supervision which is not limited to the transmission lines, but all the hardware in a transmission path between two computers is completely monitored in a mode which is economically advantageous and technically more simple. As a result of the frequent checks in each intermediate station it is furthermore simple to localize a fault to a definite part of the transmission line.

BRIEF DESCRIPTION OF THE DRAWINGS

The arrangement in accordance with the invention will now be described below with the aid of an embodiment example while referring to the appended drawing, on which FIG. 1 constitutes a block diagram of a system including an arrangement in accordance with the invention and FIG. 2 constitutes a more detailed block diagram of the system and the arrangement in accordance with the invention.

PREFERRED EMBODIMENT

A data transmission system including the arrangement in accordance with the invention is depicted in FIG. 1. A transmitting computer is denoted by the letter A, a signalling equipment SU being associated with the computer. Signals from the equipment SU are sent through a line T1 to an intermediate station EX. The station EX includes an exchange having a control computer CPM and a signalling equipment SUM associated therewith. The signals are further transmitted via the intermediate station through line T2 to a signalling equipment MU in a receiving computer B. The transmitting computer A sends signals to the receiving computer B in the form of signal units containing start-stop information, message words as well as address- and control signal information. In accordance with the invention, checking information for monitoring the transmission lines and all the hardware incorporated in the system is to be added to all this information.

As will be seen from FIG. 2, a transmitting computer A, e.g. a computer type 6800 made by Motorola, transmits messages in the form of binary data words in parallel form to the inputs of a data selector DS1 and an added AD1, both incorporated in the signalling equipment SU associated with said computer. The adder outputs are connected to the inputs on a register REG1. The adder and register together comprises a generating circuit for generating such inner check sum S by adding the data words in the message so that the final check sum provides a function of all data words included in the message.

When 8-bit words are to be added the adder AD1, e.g. two circuits in parallel ot the type SN 74283 made by Texas Instruments, receives the data words on eight parallel inputs, and also receives on eight other parallel inputs the contents from the register REG1 fed back to the adder AD1. The register, e.g. of the type SN 74273 made by Texas Instruments, is completely reset at the beginning of a cycle, a zero being added to the first data word during the first addition, which word is then fed to the register REG1 as the first check sum. The second data word is added to the such first check sum, a new sum then being sent from the adder to the register, the new sum then being added to the third data word and so on. The cycle continues until the whole of the data message has been transmitted, the inner check sum S then, being stored in the register REG1.

The data selector DS1, consisting of two circuits in parallel of the type SN 74157 made by Texas Instruments, at the start of a cycle occupies a first position in which it receives on eight parallel inputs the signal words sent from the computer A consisting of start bits, address and control signal bits and message words, and transmits these on its outputs. The data selector remains in this first position until all the message words have been transmitted, after that the data selector is switched into a second position in which it receives on eight other parallel inputs the inner check sum S from the outputs on the register REG1. When the inner check sum has been sent from the selector, it supplements the previously passed signal flow immediately after the message word last sent. After sending the check sum S, the selector reoccupies the first position, so that the sopt bits sent from the signal unit of computer A pass through the selector DS1. The instants when the selector shall perform such changes of positions are determined by a clock signal C1 transmitted from the computer A and connected to the selector. The signal flow from the output of the data selector, in which flow the inner check sum is now included, is fed to the inputs on a second data selector DS2 and to an adder AD2, the outputs of which are connected to the inputs on a register REG2.

The adder AD2 and register REG2 together provide a generating circuit for generating the outer check sum YS, by adding all the words included in the address and control signal portion, message portion and the inner check sum, so that the final outer check sum provides a function of all these signal unit portions. The adder AD2 and register REG2 are of the same make and type as the previously mentioned adder AD1 and register REG1. The process in the generation, of the outer check sum is made up in the same way as the generation of the inner check sum. The data selector DS2 is of the same make and type as the data selector DS1 and operates in the same way as the latter, i.e. in a first position the start bits, address and control signal portion, message portion and the inner check sum S passing through the selector DS2, and after that in a second position the outer check sum YS, transmitted from the outputs of the register REG2 passes through the selector to join onto the rest of the message immediately after the inner check sum. The instants when the selector is to carry out said position change-overs is determined by a clock signal C2 sent from the computer A and connected to the selector. The complete signal unit output from the data selector DS2 now has the following appearance: Start bits, address and control signal bits (header portion) the message itself in the form of a plurality of data words, the inner check sum S, the outer check sum YS and stop bits. A parallel/series converter PS1 connected to the outputs on the data selector DS2 converts the parallel signals received on the inputs to a signal flow in series form and feeds this series signal to a transmission line T1. The parallel/series converter PS1 is of the type SN 74165 made by Texas Instruments. The signal from the line T1 is fed to the input on signaling equipment SUM associated with a control computer CPM in an intermediate station EX. A series/parallel converter SP1 of the type SN 74164 made by Texas Instruments, converts the series/signal coming in on the line T1 to signals in parallel form. In intermediate station EX, which is an exchange according to the example, in the format of the complete signal unit, the address and control signals (header portions) are changed. As previously mentioned, this results in that the outer check sum YS, which responds to these parameters, must be both checked and recalculated. The inner check sum S which does not contain these parameters, is only subjected to a check that it is correct and thus passes through the exchange in an unaltered condition. For checking the outer check sum YS the intermediate station EX contains a check circuit consisting of an adder AD3, a register REG3 and a comparator circuit CO1. The adder and register together provide a generating circuit which in a mode previously described generates an outer check sum YS, by adding the signal words transmitted from the outputs on the series/parallel converter SP1 to the inputs on the adder AD3. After the whole message has been transmitted, and all the information which is utilized to form the outer check sum has been processed in the adder and register, the outer check sum YS is sent from the outputs of the register REG3 to the inputs on a comparator circuit CO1 connected to the register. This reestablished outer check sum is compared in the comparator circuit with that outer check sum YS which is generated on the transmitting side and coming in from the line T1, this latter check sum being supplied to a further number of inputs on the comparator circuit CO1. After the comparison between both sums, the circuit CO1 transmits a signal to the control computer CPM, e.g. of the type 6800 made by Motorola, which computer if obtaining a difference signal can give an order to retransmit or switch over to another line. The adder AD3 and register REG3 are of the same make and type as the corresponding units AD1 and REG1. The comparator circuit CO1 consists of two circuits in parallel of the type SN 7485 made by Texas Instruments. For checking the inner check sum S the intermediate station EX contains a checking circuit consisting of an adder AD4, a register REG4 and a comparator circuit CO2. The adder AD4 and register REG4 are of the same make and type as the corresponding units AD1 and REG1, while the comparator circuit CO2 is of the same make and type as the circuit CO1. The adder and register together provide a generating circuit which as previously described, generates an inner check sum S by adding the message words in the complete message sent from the outputs on the series/parallel converter SP1 to the inputs on the adder AD4. After the message words have been received and processed in the adder and register, the inner check sum S is sent from the outputs of the register REG4 to the inputs on a comparator circuit CO2 connected to the inputs on the register. This reestablished inner check sum S is compared in the comparator circuit CO2 with the inner check sum S formed on the transmitter side and coming in on the line T1, this latter sum being supplied to a further number of inputs on the circuit CO2. After the comparison between both sums, the circuit CO2 transmits a signal to control computer CPM, which if obtaining a difference signal gives an order for retransmission of the message or connection to another line in this case as well. The transmission is, of course, not affected when there is equality between the sums. The signals from the outputs of the series/parallel converter SP1 are also supplied to the inputs of a buffer store BM which is controlled from the control computer CPM. The buffer store is of the type 2141 made by Intel. The control computer makes the necessary amendments in the address and control signal portion (header) which corresponds to the receiving computer B. Since a new address portion has been supplied to the signal unit, a new outer check sum NYS must be calculated. To generate a new outer check sum, the intermediate station EX contains a generating circuit consisting of an adder AD5 connected to the outputs of said buffer store BM and a register REG5 connected to the outputs of said adder. In the same mode as described previously, a new outer check sum NYS is generated by adding all the words incorporated in the newly formed address and control signal portion, the message portion and the inner check sum S, so that at the end of the message the new outer check sum NYS occurring on the outputs of the register REG5 provides a function of these enumerated signal unit portions. The adder AD5 and register REG5 are of the same make and type as the circuits AD1 and REG1, previously mentioned. A data selector DS3 of the same type as the selector DS1 receives in a first position on a first plurality of inputs the signals from the outputs of the buffer store BM. The signals pass through the selector and are supplied to the inputs on a parallel/series converter PS2, of the same type as the converter PS1. When the whole message has been sent, the selector changes over to a second position to receive said outer check sum NYS on a second plurality of inputs, this check sum NYS also being fed to the parallel/series converter PS2. The selector DS3 subsequently returns to said first position, the stop pulses in the information flow being fed to the parallel/series converter PS2. From the outputs of the converter, the signals are fed in series form through a transmission line T2 to the input on signalling equipment MU, pertaining to the computer B. In a series/parallel convertor SP2, of the same type as the converter SP1, the signal received in series form is converted to parallel signals. A check is now made in the receiver that the check sums NYS and S are correct by the sums being reestablished, similarly to what has already been described, and that a comparison is made between the respective reestablished value and the corresponding one received from the line. For checking outer check sum NYS, the receiver MU contains an adder AD6, a register REG6 and a comparator circuit CO3. The adder and register together provide a generating circuit, which in the same mode as previously described generates an outer check sum NYS, by adding the signal words consisting of address and control signal portion, message portion and the inner check sum S from the outputs on the converter SP2 to the inputs on the adder AD6. AFter the whole message has been processed in the adder and register, the outer check sum is transmitted from the outputs on the register REG6 to the inputs on a comparator circuit CO3 connected to the register. This reestablished, outer check sum is compared in the comparator circuit with the outer check sum NYS coming from the line T2, this latter sum NYS being fed to a further number of inputs on the comparator circuit CO3. After comparison between both sums, the circuit CO3 transmits a signal to the receiving computer 8, and if the latter receives a difference signal it can give an order to retransmit the message or connect to another line. The circuit CO3 is of the same type as the circuit CO1, the circuits AD6 and REG6 are of the same type as the circuits AD1 and REG1, and the computer B is of the same type as the computer A. To check the inner check sum S, the receiver MU contains a check circuit consisting of an adder AD7, a register REG7 connected to the outputs on the adder, and a comparator circuit CO4 connected to the outputs of the register. Said circuits AD7, REG7 and CO4 are of the same type as the circuits AD1, REG1 and CO1. The adder and register together provide a generating unit, which in the same way as previously described generates an inner check sum S by adding the message words in the complete message transmitted on the outputs on the series/parallel converter SP2 to the inputs on the adder AD7. After the message word has been processed in the adder and register, the inner check sum S is sent from the outputs of the register REG7 to the inputs on comparator circuit CO4. This reestablished inner check sum S is compared in the comparator circuit CO4 with the inner check sum S from the line T2, the latter sum being fed to a further number of inputs on the comparator circuit CO4. After comparison between both sums, the circuit CO4 sends a signal to the receiving computer B, and in the case where it receives a difference signal, it can also order retransmission of the message or connection to another line. If thereis equality between the compared sums, the transmission is not affected, since the computer does not request retransmission or switching to another line. The complete signal unit is fed into the computer B and processed there in accordance with the contents in the message. Since the principle function of the respective computers A, B and CPM is not part of the invention, it has not been dealt with in this description either.

When synchronously duplicated processors are utilized, by introducing a check sum generating circuit for the inner check sum S in each of the duplicated processors, and by comparison between the check sums so formed, it is thus already possible on the transmitter side to decide whether the message sent from the computer is correct or not.

What we claim is:

1. In a data transmission system having information stations interconnected by transmission lines and wherein communication is by signal packets containing start-stop information, message words and address-control signal information, said address-control signal information being controllably changeable when passing through an information station, the method of monitoring the reliability of the elements of the system comprising: at the start of transmission generating an inner check sum by adding only all the message words of the signal packet to form an inner check sum which is not intentionally changed during the entire transmission, and inserting the inner check sum into the signal packet, whenever a signal packet leaves a station entering into the signal packet an address word associated with the destination of the packet, said address word being changeable during transmission in dependence on the next information station to receive the signal packet, generating an outer check sum which is at least the sum of the address word and the inner check word, inserting the outer check sum into the signal packet; and when a signal packet is received at an information station generating a receiving station inner check sum by adding only the message words of the received signal packet, comparing the receiving station inner check sum with the inner check sum previously inserted in the signal packet to determine the reliability of the upstream information station and the transmission line interconnecting the stations; and generating a receiving station outer check sum by adding all the received message words and the received inner check sum, and comparing the receiving station outer check sum with the received check sum to determine the reliability of the transmission link interconnecting the receiving information station with information check station upstream therefrom.

2. A data transmission apparatus which transmits information in signal packets having at least message words and address words indicating destinations comprising: a transmitting information station including means for generating an inner check sum which is the sum of all message words, means for generating a destination address word, and means for generating an outer check sum which is the sum of said inner check sum and said address word; a first transmission line having an input connected to said information transmitting station and an output; an intermediate information station connected to the output of said first transmission line and including checking means for generating a sum of all message words in a received packet and for generating a sum of all said message words and the address word in the received packet, means for comparing the sum of all said message words with the inner check sum in the received packet and for comparing the sum of all said message words and said inner check sum with the outer check sum of the received packet to indicate the reliability of the system upstream of said intermediate information station, means for controllably changing the destination address word of the received packet, means for generating a new outer check sum which is the sum of all received message words and the changed destination address word, and means for transmitting a signal packet which includes the received message words, the changed destination address word, the new outer check sum and the received inner check sum; a second transmission line having an input connected to the intermediate information station and an outpu; a receiving information station connected to the output of said second transmission line and having checking means for generating a sum of all message words and the sum of all message words plus the changed address destination word received from said second transmission line, and means for comparing the sum of all said message words with the inner check sum received from said second transmission line to determine the reliability of the combinations of said second transmission line and said intermediate information station and for comparing the sum of all said message words and the new destination address word with the new outer check sum received from said second transmission line to determine the reliability of said second transmission line.

3. The data transmission apparatus of claim 2 wherein at least one means for generating an inner check sum comprises adder means having a first input for receiving at least message words, a second input and an output, and register means having an input connected to the output of said adder means and an output connected to the second input of said adder means.

4. The data transmission apparatus of claims 2 or 3 wherein at lest one of said checking means includes adder means having a first input for receiving at least message words, a second input and an output and register means having an input connected to the output of said adder means and an output connected to the second input of said adder means.

5. The data transmission apparatus of claims 2 or 3 wherein at least one of said checking means comprises an accumulator means.

6. The data transmission apparatus of claim 2 wherein at least one of the means for generating a check sum comprises an accumulator means.

* * * * *